US012404592B2

(12) United States Patent
Ozkan et al.

(10) Patent No.: US 12,404,592 B2
(45) Date of Patent: Sep. 2, 2025

(54) HETEROATOM-DOPED CARBON CATALYST FOR ELECTROCATALYTIC HALOGEN PRODUCTION

(71) Applicant: Ohio State Innovation Foundation, Columbus, OH (US)

(72) Inventors: Umit Ozkan, Columbus, OH (US); Kuldeep Mamtani, Columbus, OH (US); Deeksha Jain, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 408 days.

(21) Appl. No.: 16/401,717

(22) Filed: May 2, 2019

(65) Prior Publication Data

US 2019/0338427 A1    Nov. 7, 2019

Related U.S. Application Data

(60) Provisional application No. 62/665,693, filed on May 2, 2018.

(51) Int. Cl.
| | |
|---|---|
| *C25B 1/26* | (2006.01) |
| *B82Y 30/00* | (2011.01) |
| *C25B 1/24* | (2021.01) |
| *C25B 11/02* | (2021.01) |
| *C25B 11/044* | (2021.01) |

(52) U.S. Cl.
CPC .............. *C25B 1/26* (2013.01); *C25B 1/24* (2013.01); *C25B 11/02* (2013.01); *C25B 11/044* (2021.01); *B82Y 30/00* (2013.01)

(58) Field of Classification Search
CPC .. C25B 1/26; C25B 1/24; C25B 1/245; C25B 1/46
See application file for complete search history.

(56) References Cited

U.S. PATENT DOCUMENTS

| | | |
|---|---|---|
| 5,254,226 A | 10/1993 | Williams et al. |
| 6,165,343 A | 12/2000 | Blum et al. |
| 6,811,679 B2 | 11/2004 | Ramachandraiah et al. |
| 6,855,660 B2 | 2/2005 | Tsou et al. |
| 6,967,185 B2 | 11/2005 | Allen et al. |
| 9,136,542 B2 | 9/2015 | Ozkan et al. |
| 2011/0005938 A1* | 1/2011 | Wolf ............ C25B 11/091 205/620 |
| 2017/0247801 A1 | 8/2017 | Scherson |
| 2019/0027738 A1* | 1/2019 | Ocampo ............ H01M 4/1393 |

OTHER PUBLICATIONS

U.S. Appl. No. 62/533,733, filed Jul. 18, 2017. (Year: 2017).*

(Continued)

*Primary Examiner* — Brian W Cohen
(74) *Attorney, Agent, or Firm* — Meunier Carlin & Curfman LLC (57) ABSTRACT

Disclosed herein are methods of electrochemically producing halogen using an oxygen consuming gas diffusion electrode, referred to herein as an oxygen depolarized cathode (ODC). The electrode can include heteroatom-doped carbon nanostructures as catalysts for both halogen evolving anodes and oxygen depolarized cathodes. Examples of halogens that can be produced include chlorine and bromine by oxidation of the respective halide ions.

17 Claims, 3 Drawing Sheets

(56) References Cited

OTHER PUBLICATIONS

Mamtani et al "Nitrogen-doped Carbon Nanostructures (CNx) as bifunctional electrocatalysts for oxygen reduction reaction and oxygen evolution reaction in acidic media" Abstracts of Papers, 253rd ACS National Meeting & Exposition, San Francisco, CA, Apr. 2-6, 2017, pp. CATL-28. (Year: 2017).*
Ozkan et al"Heteroatom-Doped Carbon Nanostructures as Oxygen Reduction Reaction Catalysts in Acidic Media: An Overview", Catal Lett, 2015, 145:436-450. (Year: 2015).*
Chlistunoff, Advanced chlor alkali technology, in, Los Alamos National Laboratory, Los Alamos, New Mexico, 2005, 100 pages.
K. Mamtani, D. Jain, U.S. Ozkan, Investigation of Chloride Poisoning Resistance for Nitrogen-Doped Carbon Nanostructures as Oxygen Depolarized Cathode Catalysts in Acidic Media, Catal. Lett., (2017) 1-7.
I. Moussallem, J. Jörissen, U. Kunz, S. Pinnow, T. Turek, Chlor-alkali electrolysis with oxygen depolarized cathodes: history, present status and future prospects, J. Appl. Electrochem., 38 (2008) 1177-1194.
G.S. Kumar, M. Raja, S. Parthasarthy, High performance electrodes with very low platinum loading for polymer electrolyte fuel cells, Electrochim. Acta, 40 (1995) 285.
Zion Market Research, Chlorine Market for EDC/PVC, Inorganic Chemicals, Organic Chemicals, Solvents, Pulp & Paper, Water Treatment, And Other Applications: Global Industry Perspective, Comprehensive Analysis, Size, Share, Growth, Segment, Trends and Forecast, 2015-2021, in, 2016 (Abstract).
P. Schmittinger, T. Florkiewicz, L.C. Curlin, B. Lüke, R. Scannell, T. Navin, E. Zelfel, R. Bartsch, Chlorine, Ullmann's Encyclopedia of Industrial Chemistry, (1986).
F. Federico, G. Martelli, D. Pinter, Gas-diffusion electrodes for chlorine-related (production) technologies, in: Modern Chlor-Alkali Technology, Proceedings of the 2000 London International Chlorine Symposium Organized by SCI's Electrochemical Technology Group, London, 2000, pp. 114-127.
J.A. Ober, Mineral commodity summaries 2016, in, US Geological Survey, 2016, 205 pages.
S.-H. Liu, N.-Q. Yan, Z.-R. Liu, Z. Qu, H.P. Wang, S.-G. Chang, C. Miller, Using bromine gas to enhance mercury removal from flue gas of coal-fired power plants, Environmental science & technology, 41 (2007) 1405-1412.
Technavio, Global Bromine Market 2017-2021, in, 2017 (Summary).
J. Greeley, I.E.L. Stephens, A.S. Bondarenko, T.P. Johansson, H.A. Hansen, J.F. Jaramillo, J. Rossmeisl, I. Chorkendorff, J.K. Norskov, Alloys of platinum and early transmission metals as oxygen reduction electrocatalysts, Nature Chemistry, 1 (2009).
H.R. Colón-Mercado, B.N. Popov, Stability of platinum based alloy cathode catalysts in PEM fuel cells, Journal of Power Sources, 155 (2006) 253-263.
I. Katsounaros, W.B. Schneider, J.C. Meier, U. Benedikt, P.U. Biedermann, A. Cuesta, A.A. Auer, K.J.J. Mayrhofer, The impact of spectator species on the interaction of H2O2 with platinum—implications for the oxygen reduction reaction pathways, Phys. Chem. Chem. Phys., 15 (2013) 8058.
J. Gao, J. Liu, W. Liu, B. Li, Y. Xin, Y. Yin, J. Gu, Z. Zou, An efficient and green approach to prepare hydrophilic imidazolium ionic liquids free of halide and its effect on oxygen reduction reaction of Pt/C catalyst, international journal of hydrogen energy, 37 (2012) 13167-13177.
Jebaraj, Adriel Jebin Jacob, Nicholas Georgescu, and Daniel Scherson. "Impurity effects on the oxygen reduction reaction (ORR)." Abstracts of Papers of the American Chemical Society. vol. 249. Denver, CO Mar. 22-26, 2015.].
N.M. Markovic, H.A. Gasteiger, B.N. Grgur, P.N. Ross, Oxygen reduction reaction on Pt(111): Effects of bromide, J. Electroanal. Chem., 467 (1999) 157-163.

N. Markovic, T. Schmidt, V. Stamenkovic, P. Ross, Oxygen reduction reaction on Pt and Pt bimetallic surfaces: a selective review, Fuel Cells—Weinheim—, 1 (2001) 105-116.
V. Stamenkovic, N. Markovic, P.N. Ross, Structure-relationships in electrocatalysis: oxygen reduction and hydrogen oxidation reactions on Pt (111) and Pt (100) in solutions containing chloride ions, Journal of Electroanalytical Chemistry, 500 (2001) 44-51.
T.J. Schmidt, U.A. Paulus, H.A. Gasteiger, R.J. Behm, The oxygen reduction reaction on a Pt/carbon fuel cell catalyst in the presence of chloride anions, J. Electroanal. Chem., 508 (2001) 41-47.
A.F. Gulla, L. Gancs, R.J. Allen, S. Mukerjee, Carbon-supported low-loading rhodium sulfide electrocatalysts for oxygen depolarized cathode applications, Appl. Catal. A-Gen., 326 (2007) 227-235.
Y.-F. Yang, Y.-H. Zhou, C.-S. Cha, Electrochemical reduction of oxygen on small palladium particles supported on carbon in alkaline solution, Electrochimica acta, 40 (1995) 2579-2586.
C.-C. Chang, T.-C. Wen, H.-J. Tien, Kinetics of oxygen reduction at oxide-derived Pd electrodes in alkaline solution, Electrochimica acta, 42 (1997) 557-565.
E. Yu, K. Scott, R. Reeve, Electrochemical reduction of oxygen on carbon supported Pt and Pt/Ru fuel cell electrodes in alkaline solutions, Fuel Cells, 3 (2003) 169-176.
R. Adžić, S. Strbac, N. Anastasijević, Electrocatalysis of oxygen on single crystal gold electrodes, Materials chemistry and physics, 22 (1989) 349-375.
S. Strbac, R. Adžić, The influence of OH-chemisorption on the catalytic properties of gold single crystal surfaces for oxygen reduction in alkaline solutions, Journal of Electroanalytical Chemistry, 403 (1996) 169-181.
W. King, A. Tseung, The reduction of oxygen on nickel-cobalt oxides—I: The influence of composition and preparation method on the activity of nickel-cobalt oxides, Electrochimica Acta, 19 (1974) 485-491.
V. Bagotzky, N. Shumilova, E. Khrushcheva, Electrochemical oxygen reduction on oxide catalysts, Electrochimica Acta, 21 (1976) 919-924.
J.L. Gautier, J. Ortiz, N. Heller-Ling, G. Poillerat, P. Chartier, Oxygen reduction on bornite (Cu5FeS4) in alkaline medium, Journal of Applied Electrochemistry, 1998, 28: 827-834.
J.M. Ziegelbauer, D. Gatewood, A.F. Gulla, M.J.-F. Guinel, E. Frank, D.E. Ramaker, S. Mukerjee, Fundamental investigation of oxygen reduction reaction on rhodium sulfide-based chalcogenides, J. Phys. Chem. C, 113 (2009) 6955-6968.
A.N. Buckley, Nitrogen functionality in coals and coal-tar pitch determined by X-ray photoelectron spectroscopy, Fuel Process Technol., 38 (1994) 165-179.
S. Trasatti, Electrocatalysis: understanding the success of DSA®, Electrochimica Acta, 45 (2000) 2377-2385.
S. Trasatti, Progress in the understanding of the mechanism of chlorine evolution at oxide electrodes, Electrochimica Acta, 32 (1987) 369-382.
S. Trasatti, Electrocatalysis in the Anodic Evolution of Oxygen and Chlorine Electrochim. Acta, 29 (1984) 1503-1512.
N. Menzel, E. Ortel, K. Mette, R. Kraehnert, P. Strasser, Dimensionally Stable Ru/Ir/$TiO_2$-Anodes with Tailored Mesoporosity for Efficient Electrochemical Chlorine Evolution, ACS Catalysis, 3 (2013) 1324-1333.
Z. Yi, C. Kangning, W. Wei, J. Wang, S. Lee, Effect of IrO2 loading on $RuO_2$—$IrO_2$—$TiO_2$ anodes: A study of microstructure and working life for the chlorine evolution reaction, Ceramics International, 33 (2007) 1087-1091.
L.I. Krishtalik, Kinetics and mechanism of anodic chlorine and oxygen evolution reactions on transition metal oxide electrodes, Electrochimica Acta, 26 (1981) 329-337.
V.V. Panic, A. Dekanski, S.K. Milonjić, R.T. Atanasoski, B.Ž. Nikolić, $RuO_2$—$TiO_2$ coated titanium anodes obtained by the sol-gel procedure and their electrochemical behaviour in the chlorine evolution reaction, Colloids and Surfaces A: Physicochemical and Engineering Aspects, 157 (1999) 269-274.
R.K.B. Karlsson, H.A. Hansen, T. Bligaard, A. Cornell, L.G.M. Pettersson, Ti atoms in $Ru_{0.3}Ti_{0.7}O_2$ mixed oxides form active and selective sites for electrochemical chlorine evolution, Electrochimica Acta, 146 (2014) 733-740.

(56) References Cited

OTHER PUBLICATIONS

A.S. Pilla, E.O. Cobo, M.M.E. Duarte, D.R. Salinas, Evaluation of anode deactivation in chlor-alkali cells, Journal of Applied Electrochemistry, 27 (1997) 1283-1289.

S. Ferro, A. De Battisti, I. Duo, C. Comninellis, W. Haenni, A. Perret, Chlorine Evolution at Highly Boron-Doped Diamond Electrodes, Journal of the Electrochemical Society, 147 (2000) 2614-2619.

N. Gedam, N.R. Neti, M. Kormunda, J. Subrt, S. Bakardjieva, Novel Lead dioxide-Graphite-Polymer composite anode for electrochemical chlorine generation, Electrochimica Acta, 169 (2015) 109-116.

W. Kondo, S. Mizuta, Y. Oosawa, T. Kumagai, K. Fujii, Decomposition of hydrogen bromide or iodide by gas phase electrolysis, Bulletin of the Chemical Society of Japan, 56 (1983) 2504-2508.

G. Schuetz, P. Fiebelmann, Electrolysis of hydrobromic acid, International Journal of Hydrogen Energy, 5 (1980) 305-316.

J. Luttmer, D. Konrad, I. Trachtenberg, Electrode materials for hydrobromic acid electrolysis in Texas Instruments' solar chemical converter, Journal of the Electrochemical Society, 132 (1985) 1054-1058.

J. Xu, N.S. Georgescu, D.A. Scherson, The Oxidation of Bromide on Platinum Electrodes in Aqueous Acidic Solutions: Electrochemical and In Situ Spectroscopic Studies, Journal of The Electrochemical Society, 161 (2014) H392-H398.

\* cited by examiner

HETEROATOM-DOPED CARBON CATALYST FOR ELECTROCATALYTIC HALOGEN PRODUCTION

CROSS REFERENCE TO RELATED APPLICATIONS

This application claims the benefit of U.S. Provisional Patent Application Ser. No. 62/665,693 filed May 2, 2018, the disclosure of which is expressly incorporated herein by reference.

STATEMENT REGARDING GOVERNMENT SUPPORT

This invention was made with government support under grant number DE-FG02-07ER15896 awarded by the Department of Energy. The government has certain rights in the invention.

FIELD

This application relates to electrochemical production of halogens using heteroatom-doped carbon catalysts.

BACKGROUND

Chlorine is an essential chemical in a vast majority of processes that produce many indispensable products, especially polymers like polyvinyl chloride, polyurethanes and chloroaromatics. It is an irreplaceable component in about 93% of life saving pharmaceuticals, 86% of pesticides, fiber optics, hypochlorite bleaches and many more commodities. The Chlorine Institute statistics estimated a production of 11.6 million short tons of chlorine in 2010 with annual sales of more than $8 billion. The global chlorine market is projected to grow rapidly and reach a value of ~38.4 billion in 2021. Conventional catalyst for producing chlorine are Pt-based which are susceptible to poisoning by chloride exposure. Rhodium sulfide materials ($Rh_xS_y$) are also commercially used as catalysts. Their commercial applicability is less viable due to their extremely high costs and limited availability.

Bromine is extensively used in the manufacture of several indispensable compounds such as flame retardants, dyes, pharmaceuticals, photographic chemicals, paper, fumigants and biocides. Bromine also finds significant uses in water treatment applications, drilling fluids and as an oxidant for removal of mercury from flue gas of coal-fired power plants. Technavio research estimated the value of global bromine market to be $4637.2 million in 2016 with an estimated rise to $6341.4 million in 2021. USA is the leading manufacturer of bromine, contributing to ~35% of the total bromine production in the world. Bromine is generally produced from brine, which includes distillation to separate bromine from water and chlorine However, both chlorine and bromine are extremely hazardous gases to handle.

There is a need for safer, more cost effective, and energy efficient means for producing halogens. The systems and method disclosed herein address these and other needs.

SUMMARY

Figures 1A, 1B:
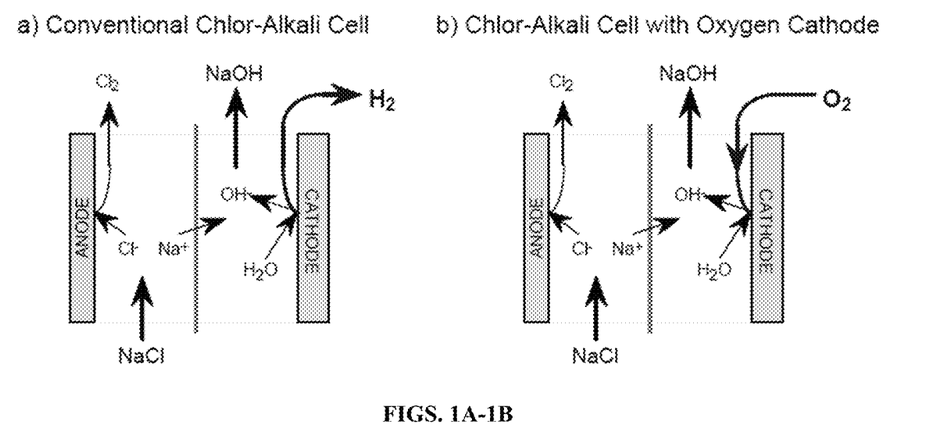
FIGS. 1A-1B show a chlor alkali process using conventional cell (FIG. 1A) and oxygen depolarized cathode, ODC (FIG. 1B).
Figure 2:
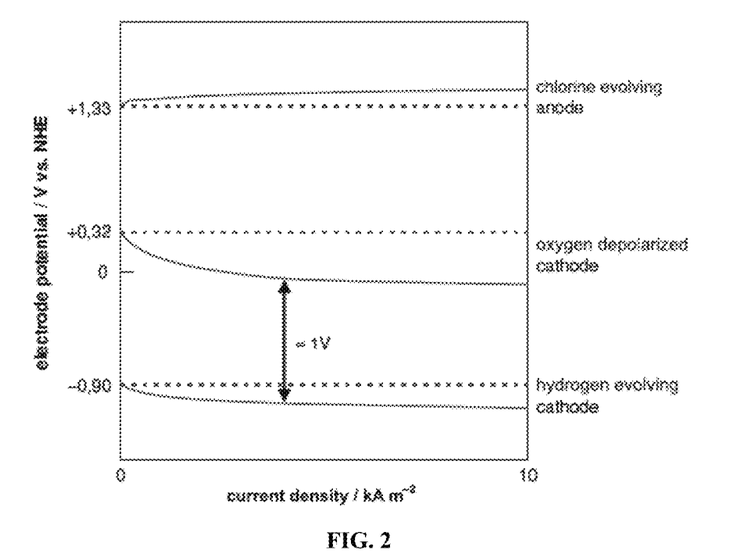
FIG. 2 shows electrode potentials in chlor alkali process using a conventional hydrogen evolving cathode as compared to that of an oxygen depolarized cathode (ODC).

Chlor-alkali process based on membrane technology is very energy intensive and consumes about 2500 kWh per ton of $Cl_2$. Disclosed herein are methods of producing halogen using an $O_2$ consuming gas diffusion electrode which reduces the power consumption by almost 30% (FIG. 1). This oxygen consuming electrode is called the oxygen depolarized cathode (ODC). The following reactions take place in the chlor-alkali process that uses oxygen depolarized cathodes:

ORR taking place on the cathode reduces the overall cell potential of chlor-alkali process by ~1 V as shown in FIG. 2.

Also disclosed are the use of ODC process in system for electrolysis of aqueous hydrochloric acid (HCl), which theoretically saves about 700 kWh of energy per ton of $Cl_2$ with an overall reaction:

Like chlorine production, the energy input required for electrocatalytic bromine production (or bromide removal) can be significantly reduced by employing the use of oxygen depolarized cathodes instead of hydrogen evolving anodes.

Further described herein is the use of heteroatom-doped carbon nanostructures as anode and cathode catalysts for production of halogens, such as chlorine and bromine by oxidation of the respective halide ions. In specific examples, the use of heteroatom-doped carbon nanostructures as catalysts for both chlorine evolving anodes and oxygen depolarized cathodes for chlorine manufacture in acidic and alkaline media are disclosed. In other specific examples, the use of oxygen depolarized cathodes during the electrolysis of bromide ions in both acidic and alkaline media, in order to reduce the consumption of energy during the electrolysis process are disclosed. In further specific examples, the use of heteroatom-doped carbon nanostructures as catalysts for anodic bromine evolution reaction as well as oxygen depolarized cathodes for bromine production. In ever further specific examples, the heteroatom doping includes the possibility of doping carbon nanostructures with one or more elements like nitrogen, phosphorus, boron, sulfur, halogens such as chlorine or transition metals like iron and cobalt.

The main advantages of the systems and methods disclosed herein over the existing processes include elimination of use of hazardous gases like chlorine during the production of bromine, hence enhancing process safety; reduction in cost of electricity by incorporating the use of oxygen depolarized cathodes for both chlorine and bromine manufacture; use of heteroatom-doped carbon nanostructures as catalysts for chlorine evolution, bromine evolution as well as oxygen depolarized cathodes, thus tremendously lowering the cost of catalyst as compared to the state-of-the-art precious metal-based catalysts; removal of halide ions from solutions/effluents containing very low concentrations of dissolved ions, thus reducing the need for concentrating solutions before electrolysis; selective bromide and/or chloride removal from aqueous solutions by controlling the applied voltage; and halide poisoning resistance of heteroatom-doped carbon nanostructures used as oxygen depolarized cathodes.

A broad range of applications of the systems and methods disclosed herein include electrocatalytic chlorine and bromine gas production for a variety of uses as disclosed herein; electrocatalytic waste water treatment—removal of chloride and bromide ions from solutions where these ions are present even in either very small concentrations, or in varying concentrations like effluent from industries, drilling wells and coal-fired power plants; selective removal of chloride or bromide ions from aqueous solutions; and energy storage applications using HBr electrolysis.

DETAILED DESCRIPTION

Disclosed herein are methods for electrochemically producing a halogen. Such halogens can include chlorine, bromine, or a mixture thereof. The method can comprise contacting a halide ion with a heteroatom-doped carbon catalyst in an electrochemical cell, and optionally applying a current or potential to the electrochemical cell to form the halogen.

Heteroatom-doped carbon catalyst are described in U.S. Pat. No. 9,136,542 to Ozkan et al., which is hereby incorporated by reference in its entirety. In some embodiments, the heteroatom-doped carbon catalyst comprises a heteroatom selected from nitrogen, phosphorous, boron, sulfur, a halogen such as bromine or chlorine, a transition metal such as cobalt or iron, or a combination thereof. Other suitable transition metals or transition metal alloys may include any of those found in Groups 3-12 of the Periodic Table of Elements and, by way of specific example, the transition metal may include nickel (Ni), manganese (Mn), or an iron-copper alloy. In some examples, the heteroatom includes nitrogen, phosphorous, iron, cobalt, chlorine, sulfur, boron, or a combination thereof. In some embodiments, the heteroatom-doped carbon catalyst includes at least a trace amount of a transition metal to not more than 3 wt % of the transition metal.

The heteroatom-doped carbon-containing catalyst may be represented by the chemical formula $CP_y$. In some embodiments, the heteroatom-doped carbon-containing catalyst may be represented by the chemical formula $CN_x$. In one embodiment, the heteroatom-doped carbon-containing catalyst is doped with both nitrogen and phosphorous so that the catalyst may be represented by the chemical formula $CN_xP_y$. In certain embodiments, the heteroatom-doped carbon catalyst can be represented by the chemical formula $CN_xP_y$, where x is from 0 to about 10 wt % and y is from 0 to about 10 wt %, wherein at least one of x and y is greater than 0 wt %. For example, y can be in the range of from about 1 ppm to about 6 wt %. In other examples, x can be in the range of from about 1 ppm to about 10 wt %.

In one embodiment, the heteroatom-doped carbon-containing catalyst is represented by the chemical formula $CN_x$ and/or $CP_y$ and/or $CN_xP_y$ in which y is less than about 10 wt % though a minimal amount of phosphorus is present. As is set forth in more detail below, the heteroatom-doped carbon-containing catalyst may be synthesized and/or grown from a phosphorus-containing fluid or a phosphorus-containing support material. The catalyst may therefore incorporate at least a minimal amount phosphorus from the synthesis process. The minimum amount of phosphorus may be an amount that is at or below the limit of detection for X-ray Photoelectron Spectroscopy (XPS). In one embodiment, phosphorus is present in at least about 1 part per million (ppm). By way of example, y may be in the range of from about 1 ppm to about 6 wt %, and by way of further example, y may be in the range of from about 1 ppm to about 2 wt %. The amount of nitrogen represented by "x" in $CN_x$ or $CN_xP_y$ may range from about 1 ppm to about 10 wt % and, by way of further example, nitrogen may range from about 1 wt % to about 10 wt %. In one embodiment, the heteroatom-doped carbon-containing catalyst does not include any intentionally added dopants or additions, other than P and N. However, the heteroatom-doped carbon-containing catalyst may include other elements, such as, oxygen and/or sulfur, introduced by exposing the catalyst to the ambient atmosphere or introduced from raw materials during processing and/or may include metals, such as, iron (Fe) or cobalt (Co), which may be encapsulated by carbon. Because the nanostructures synthesized by the processes described herein are primarily carbon graphite, they are generally electrically conductive.

In one embodiment, the heteroatom-doped carbon-containing catalyst consists essentially of $CN_x$ and/or $CP_y$ and/or $CN_xP_y$. As used herein, "consisting essentially of" means that no other elements are intentionally added to the catalyst. However, impurity content of other elements from the raw materials in the growth process may be contemplated. Further, residual seed material or other nanostructure growth-facilitating material in the catalyst may also be contemplated.

Methods of preparing the heteroatom-doped carbon-containing catalyst are described herein and further in U.S. Pat. No. 9,136,542, which is incorporated herein by reference in its entirety.

The electrochemical cell used for production of the halogen can include a pair of electrodes comprising an anode and a cathode. At least one of the anodes and the cathode can comprise the heteroatom-doped carbon catalyst. In some instances, both the anode and the cathode can comprise the heteroatom-doped carbon catalyst. The anode and the cathode may be free of other catalysts, other than the heteroatom-doped carbon catalyst. For example, the anode and the cathode may not contain a precious metal.

The heteroatom-doped carbon catalyst can be present as a nanostructure. Examples of suitable nanostructures include at least one of a nanofiber, a nanotube, a herringbone structure, a stacked platelet, a ribbon, a stacked cup, graphene sheet, amorphous carbon, or an onion-like nanostructure.

With reference to FIG. 1, an electrolyte is in direct contact with and separates the anode from the cathode. The electrolyte can function as an electrical insulator and separates the fuel from the oxidant while providing high ionic conductivity. The fuel can include halide ions such as bromide or chloride ions and the oxidant may be oxygen in air or from another source. However, it will be appreciated that embodiments of the present invention are not limited to a specific fuel and/or oxidant, as other fuels and/or oxidants may be used in accordance with the principles disclosed herein.

By this exemplary arrangement, the flow of the halide ions across the anode produces a halogen and electrons. The halogen can be evolved as a gas. The electrons meanwhile travel through the external circuit to the cathode. At the cathode, oxygen present in the oxidant combines with the protons and the electrons. In this electrochemical reaction, oxygen is reduced by the electrons and combined with water (such as from an alkaline medium) to produce hydroxide ions or combine with protons (such as from an acidic medium) to produce water and heat. Advantageously, no environmental pollutants are produced.

In one embodiment, the electrode may include a plurality of particles of the heteroatom-doped carbon-containing catalyst in electrical contact with one another. In this embodiment, the through-thickness of the electrode may therefore measure at least one particle in width. However, it will be appreciated that the electrode containing a plurality of heteroatom-doped carbon-containing catalyst particles do not need a support material.

Further in this regard, the electrode may also include particles of an additional material. The additional material may be another catalyst material, such as, platinum (Pt); an electrically conductive, non-catalyst material, such as, a support material; and/or a non-conducting polymeric material, such as, Nafion®. Thus, the electrode may be formed of a mixture of particles of the heteroatom-doped carbon-containing catalyst and particles of other materials. In one embodiment, the electrode is free of precious metals, such as, Pt. Exemplary materials that may be mixed with the particles of the heteroatom-doped carbon-containing catalyst may include carbides, nitrides, sulfides, oxides, and/or borides. In embodiments with a mixture of the heteroatom-doped carbon-containing catalyst and another material, the relative percentage of the particles of the catalyst may vary depending on the application for the electrode.

The examples below are intended to further illustrate certain aspects of the methods, systems, and compositions described herein, and are not intended to limit the scope of the claims.

Examples

Chlorine Production:

The most commonly used methodology for manufacturing chlorine is the chlor-alkali process—an electrocatalytic process where sodium chloride is electrolyzed to form chlorine at the anode, and sodium hydroxide solution and hydrogen gas at the cathode. The overall reaction is as follows:

$$2NaCl + 2H_2O + electricity \rightarrow 2NaOH + H_2 + Cl_2 \text{ (Overall)}$$

Anode reaction: $2Cl^- \rightarrow Cl_2 + 2e^-$ (Chlorine evolution reaction)

Cathode reaction: $2Na^+ + 2H_2O + 2e^- \rightarrow 2NaOH + H_2$

Chlor-alkali process based on membrane technology is very energy intensive and consumes about 2500 kWh per ton of $Cl_2$. This traditional cathode can be replaced by an $O_2$ consuming gas diffusion electrode which reduces the power consumption by almost 30% (FIG. 1). This oxygen consuming electrode is called the oxygen depolarized cathode (ODC).

Following reactions take place in the chlor-alkali process that uses oxygen depolarized cathodes:

$$2NaCl + H_2O + \tfrac{1}{2}O_2 + electricity \rightarrow 2NaOH + Cl_2 \text{ (Overall)}$$

Anode reaction: $2Cl^- \rightarrow Cl_2 + 2e^-$ (Chlorine evolution reaction)

Cathode reaction: $O_2 + 2H_2O + 4e^- \rightarrow 4OH^-$ (Oxygen reduction reaction (ORR))

ORR taking place on the cathode reduces the overall cell potential of chlor-alkali process by ~1 V as shown in FIG. 2.

Electrolysis of aqueous hydrochloric acid (HCl) is another widely used process for manufacture of chlorine gas. The overall reaction can be represented as—

$$2HCl + electricity \rightarrow H_2 + Cl_2$$

The above reaction typically consumes about 1500 kWh per ton of $Cl_2$. ODC process in this system theoretically saves about 700 kWh of energy per ton of $Cl_2$ with an overall reaction:

$$2HCl + \tfrac{1}{2}O_2 + electric\ energy \rightarrow Cl_2 + H_2O$$

Anode reaction: $2Cl^- \rightarrow Cl_2 + 2e^-$ (Chlorine evolution reaction)

Cathode reaction: $2H^+ + \tfrac{1}{2}O_2 + 2e^- \rightarrow H_2O$ (Oxygen reduction reaction)

Bromine Production:

Bromine is generally recovered from dissolved salts present in sea water, inland seas and brine wells. The process of bromine manufacture typically consists of two basic stages:

Oxidation of bromide ions to bromine gas

Purification of crude bromine gas to produce pure bromine

Oxidation of bromide ions from aqueous solutions of HBr or NaBr is typically performed using chlorine gas. The overall reaction taking place is as follows:

$$Cl_{2(g)} + 2Br^-_{(aq)} \rightarrow Br_{2(l)} + 2Cl^-_{(aq)}$$

However, the main drawback of this process is that it requires handling of chlorine gas, which is extremely hazardous, thus make the process less safe to use.

Bromine can also be obtained by electrolysis of HBr, NaBr, bromide-ion rich brines or from effluent waste water containing bromide ions.

Anode reaction: $2Br^- \rightarrow Br_2 + 2e^-$ (Bromine evolution reaction)

Like chlorine production, the energy input required for electrocatalytic bromine production (or bromide removal) can be significantly reduced by employing the use of oxygen depolarized cathodes instead of hydrogen evolving anodes.

Catalysts for Oxygen Depolarized Cathodes (ODCs):

Successful operation of oxygen depolarized cathodes highly depends on the nature of catalyst—its activity and stability towards oxygen reduction reaction (ORR). Platinum based materials are generally shown to be the most effective catalysts for ORR. However, platinum is known to get poisoned in the presence of halides leading to a loss of its ORR activity and increase in peroxide formation. Even though there is no direct contact between the halide ions (Cl⁻ or Br⁻) and cathode catalyst, the Pt based materials can be easily poisoned due to crossover of halide ions to the cathode side through the proton/anion conducting membrane or during shut down of electrolytic cells.

Severe corrosion of platinum based materials has led to several attempts to discover more stable materials to be used as ODC catalysts. These include the use of palladium metal supported on carbon, palladium oxide coated titanium electrodes, carbon supported Pt/Ru catalysts, crystalline gold catalysts, nickel-cobalt oxides with the composition $Co_2NiO_4$ and transition metal sulfides. Problems with the stability and durability of these materials were partially addressed by development of rhodium based materials as catalysts for ODCs. Although these $Rh_xS_y$ catalysts exhibit a very good performance in terms of activity and stability, their commercial applicability is less viable due to their extremely high costs and limited availability.

Catalysts for Chlorine-Evolving Anodes:

The following reaction takes place at the anode of an HCl/NaCl electrolysis cell.

$$2Cl^- \rightarrow Cl_2 + 2e^- (E^0 = -1.36 \text{ V vs. RHE})$$

The need for bulk chlorine production has led to the development of the so-called dimensionally stable anodes (DSAs) in 1971 which are now commercially used as catalysts for electrochemical chlorine evolution reaction (CER). In the 1950s, however, before the introduction of DSAs, graphite anodes were used in chlor-alkali cells. But these graphite anodes were found to be unstable due to the release of $O_2$. A variety of research groups have developed different metal oxides to be used as DSAs for chlorine evolution reaction. $TiO_2$ based catalysts containing Ru and/or Ir oxides have been shown to be both active and stable for CER. There are also some studies that propose the use of CER electrocatalysts other than DSAs like boron doped diamond electrodes and graphite powder coated with lead oxide.

Catalysts for Bromine-Evolving Anodes:

The Wunsche process and the Kossuth process developed in the 1950s and 1960s, respectively, proposed the use of bipolar graphite electrodes for oxidation of bromide ions. Other processes reported in literature also utilized electrolytic cells containing graphite electrodes for bromide oxidation in both aqueous phase and gas phase systems. Precious metal containing catalysts have also found use in electrocatalytic oxidation of bromide anions. Ramachandraiah et al. used a precious triple metal oxide coated titanium catalyst for oxidation of bromide anions. Texas Instruments also identified sputtered iridium and iridium oxide thin films as the choice for anodic materials for HBr electrolysis in their solar chemical converters. More recently, Scherson and co-workers proposed the use of porous platinum-containing electrodes for oxidation of bromide ions to bromine gas in aqueous solutions.

In this context, described herein is the use of heteroatom-doped carbon nanostructures as anode and cathode catalysts for production of chlorine and bromine by oxidation of the respective halide ions.

Accordingly, described herein are:

a. Use of heteroatom-doped carbon nanostructures as catalysts for both chlorine evolving anodes and oxygen depolarized cathodes for chlorine manufacture in acidic and alkaline media.

b. Use of oxygen depolarized cathodes during the electrolysis of bromide ions in both acidic and alkaline media, in order to reduce the consumption of energy during the electrolysis process.

c. Use of heteroatom-doped carbon nanostructures as catalysts for anodic bromine evolution reaction as well as oxygen depolarized cathodes for bromine production.

d. Heteroatom doping includes the possibility of doping carbon nanostructures with one or more elements like nitrogen, phosphorus, boron, sulfur, chlorine or transition metals like iron and cobalt.

The main advantages of the proposed technology over the existing processes are listed below:

a. Elimination of use of hazardous gases like chlorine during the production of bromine, hence enhancing process safety.

b. Reduction in cost of electricity by incorporating the use of oxygen depolarized cathodes for both chlorine and bromine manufacture.

c. Use of heteroatom-doped carbon nanostructures as catalysts for chlorine evolution, bromine evolution as well as oxygen depolarized cathodes, thus tremendously lowering the cost of catalyst as compared to the state-of-the-art precious metal-based catalysts.

d. Removal of halide ions from solutions/effluents containing very low concentrations of dissolved ions, thus reducing the need for concentrating solutions before electrolysis.

e. Selective bromide and/or chloride removal from aqueous solutions by controlling the applied voltage.

f. Halide poisoning resistance of heteroatom-doped carbon nanostructures used as oxygen depolarized cathodes.

A broad range of applications of this technology include the following:

a. Electrocatalytic chlorine and bromine gas production for a variety of uses as listed before.

b. Electrocatalytic waste water treatment: Removal of chloride and bromide ions from solutions where these ions are present even in either very small concentrations, or in varying concentrations like effluent from industries, drilling wells and coal-fired power plants.

c. Selective removal of chloride or bromide ions from aqueous solutions.

d. Energy storage applications using HBr electrolysis.

The following section describes the general process of synthesis of heteroatom-doped carbon nanostructures to be used as catalysts for electrocatalytic halogen production.

Figure 3:
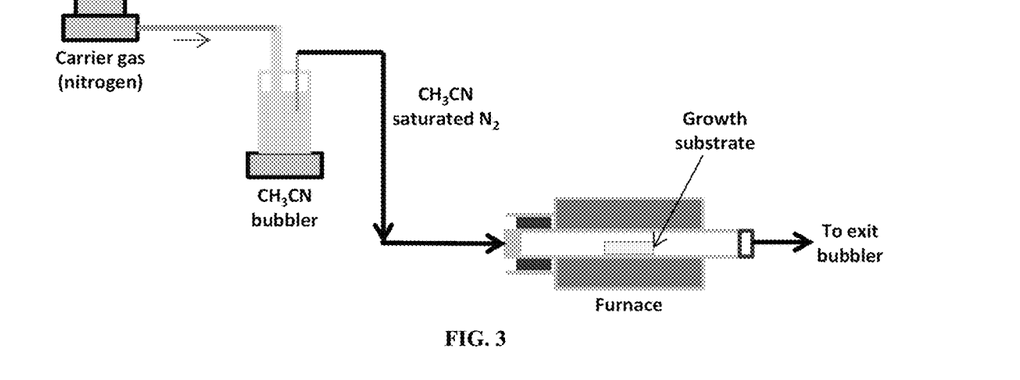
FIG. 3 shows a schematic of chemical vapor deposition for growth of $CN_x$.

Synthesis of Heteroatom-Doped Carbon Nanostructures as Catalysts for Chlorine and Bromine Production:

Carbon nanostructures doped with one or more heteroatoms like nitrogen, phosphorus, boron, sulfur and halogens can be used as oxygen depolarized cathodes as well as anodes for chlorine/bromine evolution in the process of chlorine and bromine production via electrolysis of chloride/bromide containing solutions. These materials can be synthesized using either metallic or non-metallic precursors as substrates. For example, nitrogen-doped carbon nanostructures ($CN_x$) can be synthesized using one of the following two procedures:

1. $CN_x$ is synthesized by using chemical vapor deposition technique on iron doped MgO substrate. Fe/MgO growth substrate is prepared either using incipient wetness impregnation or wet impregnation of Fe acetate on MgO, which is then dried overnight in an oven at 100° C. This growth substrate is then ball-milled and subjected to acetonitrile-saturated nitrogen stream at an elevated temperature (>750° C.) in a furnace for two hours (FIG. 3).

$CN_x$ hence grown over the support is acid washed using 1 N HCl or $H_2SO_4$ for one hour followed by vacuum filtration and rinsing with de-ionized water to remove the excess acid. The vacuum filtered sample is dried overnight in an oven at 70° C. to obtain $CN_x$.

2. Metal free $CN_x$ is synthesized using a mixture of GO oxide and urea (in varying ratios by mass) suspended in 100 ml of 1:1 ethanol:water mixture under continuous stirring at 70° C. After the solvent volume reduces to half of its initial volume, the precursor is dried overnight in an oven at 70° C. The dried precursor is ball milled and subjected to a shock heat treatment step under inert or ammonia atmosphere at temperatures above 900° C. for one hour.

Other heteroatoms can be similarly incorporated into the carbon nanostructures during the wetness impregnation step, ball milling step, chemical vapor deposition step or post— acid washing step to enhance their electrocatalytic activity towards ORR taking place on oxygen depolarized cathode and chlorine/bromine evolution taking place on the anode.

Figure 4A:
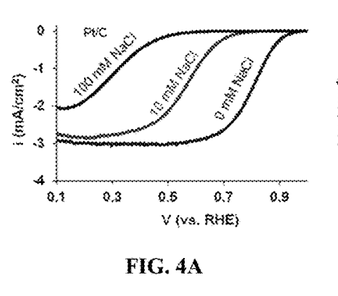
FIGS. 4A-4C show ORR cyclic voltammograms of Pt/C (FIG. 4A), $Rh_xS_y$ (FIG. 4B), and $CN_x$ (FIG. 4C) catalysts collected in the presence of chloride ions in acidic electrolyte saturated with oxygen at a scan rate of 10 mV/s with the electrode rotating at 1600 rpm.
Figure 4B:
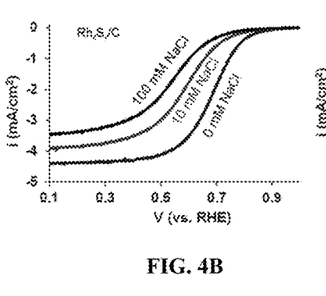
Figure 4C:
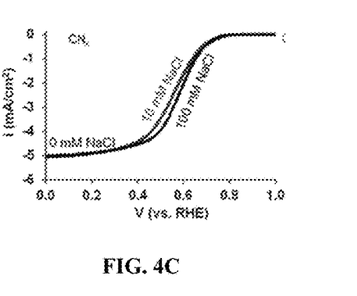

Preliminary Results:

Due to the absence of a metal-centered active sites in heteroatom-doped carbon nanostructures, they are found to be resistant to poisoning by chloride ions unlike state-of-the-art ORR catalysts like Pt/C and ODC catalysts like $Rh_xS_y$. This is illustrated in the electrochemical half-cell measurements shown in FIG. 4. Both Pt/C and $Rh_xS_y$ catalysts partially lose their ORR activity in the presence of $Cl^-$ ions in concentrations as low as 10 mM. $CN_x$ catalysts are however resistant to poisoning in the presence of even higher amounts of chloride ions. Similar resistance to poisoning is expected for these carbon-based materials in the presence of bromide ions.

Figure 5:
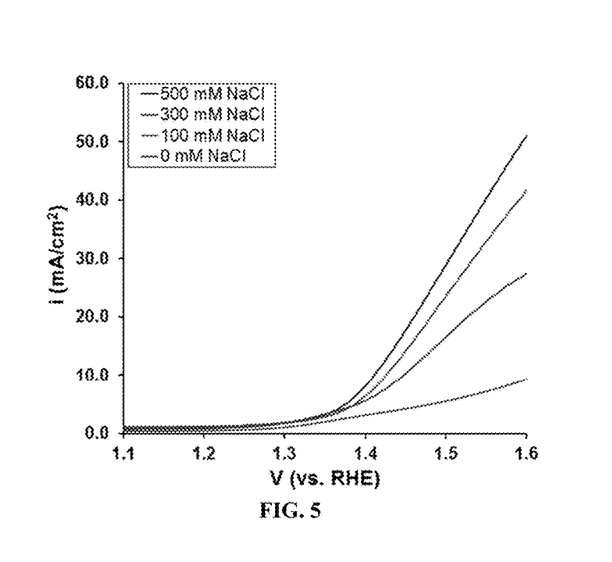
FIG. 5 shows evaluation of $CN_x$ for chlorine evolution in acidic media containing various amounts of chloride ions, Ar saturated electrolyte, 1600 rpm.
Figure 6:
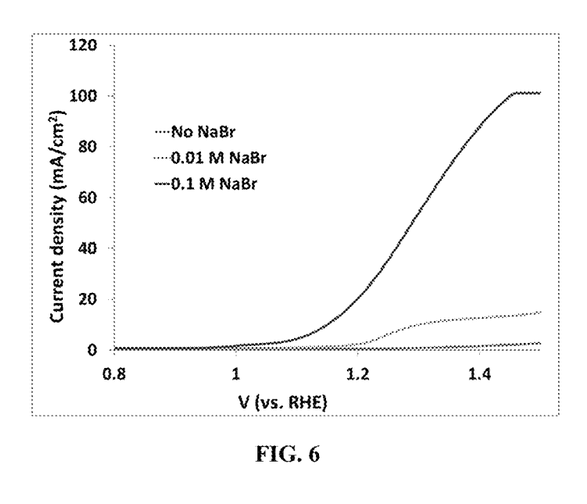
FIG. 6 shows evaluation of $CN_x$ for bromide ion oxidation in acidic media containing various amounts of chloride ions, Ar saturated electrolyte, 1600 rpm.

The potential of using $CN_x$ catalysts for the anode reaction of chlorine evolution has also been evaluated. FIG. 5 shows an increase in current density of linear sweep voltammograms collected in the CER region, with an increase in chloride concentration in the electrolyte, indicating the evolution of chlorine gas. Similarly, oxidation of bromide ions in acidic media is illustrated in FIG. 6. Bromide ion concentrations as low as 10 mM can be electrochemically oxidized using $CN_x$ catalysts.

These results show the promise of using heteroatom-doped carbon nanostructures as both anode and cathode catalysts for electrocatalytic halogen production using oxygen depolarized cathodes.

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods in addition to those shown and described herein are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for electrochemically producing a halogen, comprising:
    contacting a halide ion in acidic or alkaline electrolyte media with a heteroatom-doped carbon catalyst in an electrochemical cell, wherein the halide ion is present in the acidic or alkaline electrolyte media at a concentration of from 10 mM to less than 500 mM, and applying a current or potential to the electrochemical cell to produce the halogen,
    wherein the heteroatom-doped carbon catalyst comprises a heteroatom selected from nitrogen, phosphorous, boron, sulfur, chlorine, a transition metal, or a combination thereof; and
    wherein the heteroatom-doped carbon catalyst is present as a nanostructure selected from the group consisting of a herringbone structure, a stacked platelet, a stacked cup, a graphene sheet, or a combination thereof.

2. The method of claim 1, wherein the heteroatom includes phosphorous, iron, cobalt, chlorine, sulfur, boron, or a combination thereof.

3. The method of claim 1, wherein the heteroatom-doped carbon catalyst is represented by the chemical formula $CN_xP_y$, where x is from 0 to about 10 wt % and y is from 0 to about 10 wt %, wherein at least one of x and y is greater than 0 wt %.

4. The method of claim 3, wherein y is in the range of from about 1 ppm to about 6 wt %.

5. The method of claim 3, wherein x is in the range of from about 1 ppm to about 10 wt %.

6. The method of claim 1, wherein the electrochemical cell comprises a pair of electrodes comprising an anode and a cathode;
    wherein at least one of the anode and the cathode comprise the heteroatom-doped carbon catalyst.

7. The method of claim 6, wherein the anode and the cathode comprise the heteroatom-doped carbon catalyst.

8. The method of claim 7, wherein the anode and the cathode are free of other catalysts.

9. The method of claim 6, wherein the electrode does not contain a precious metal.

10. The method of claim 1, wherein the nanostructure is selected from the group consisting of a herringbone structure, a stacked platelet, a stacked cup, or a combination thereof.

11. The method of claim 1, wherein the heteroatom-doped carbon catalyst includes at least a trace amount of a transition metal to not more than 3 wt % of the transition metal.

12. The method of claim 1, wherein the halogen produced is chlorine, bromine, or a mixture thereof.

13. The method of claim 12, wherein the halogen produced comprises bromine.

14. The method of claim 1, wherein the heteroatom-doped carbon catalyst does not comprise phosphorous.

15. The method of claim 1, wherein the heteroatom-doped carbon catalyst comprises nitrogen.

16. The method of claim 1, wherein the halide ion is present in the acidic or alkaline electrolyte media at a concentration of from 10 mM to 300 mM.

17. The method of claim 1, wherein the electrochemical cell further comprises an oxygen depolarized cathode.

* * * * *